United States Patent
Baur et al.

[11] Patent Number: 6,129,560
[45] Date of Patent: Oct. 10, 2000

[54] CONNECTOR WITH A STRIP CONNECTOR FITTED WITH ELECTRICAL COMPONENTS, METHOD FOR THE PRODUCTION THEREOF

[75] Inventors: Richard Baur, Pfaffenhofen; Günter Fendt; Michael Bischoff, both of Schrobenhausen; Tanja Schmidt, Weibersbrunn; Jürgen Röder, Darmstadt, all of Germany

[73] Assignees: Temic Telefunken Microelectronic GmbH, Heilbronn, Germany; Thomas & Betts GmbH, Egelsbach

[21] Appl. No.: 09/194,182
[22] PCT Filed: Mar. 24, 1998
[86] PCT No.: PCT/EP98/01716
§ 371 Date: Aug. 26, 1999
§ 102(e) Date: Aug. 26, 1999
[87] PCT Pub. No.: WO98/43326
PCT Pub. Date: Oct. 1, 1998

[30] Foreign Application Priority Data

Mar. 24, 1997 [DE] Germany ............. 197 12 314

[51] Int. Cl.$^7$ ............................ H01R 12/00
[52] U.S. Cl. .................. 439/76.1; 439/76.2; 439/736
[58] Field of Search .................. 439/76.1, 76.2, 439/638, 188, 352, 353, 78, 736, 722, 885, 105, 535, 650, 652, 654

[56] References Cited

U.S. PATENT DOCUMENTS

| | | | |
|---|---|---|---|
| 4,766,520 | 8/1988 | Huber et al. | 439/76.1 |
| 5,435,754 | 7/1995 | Hotea et al. | 439/620 |

FOREIGN PATENT DOCUMENTS

| | | |
|---|---|---|
| 1 911 779 | 9/1970 | Germany . |
| 27 35 124 C2 | 2/1978 | Germany . |
| 2735124A1 | 2/1978 | Germany . |
| 27 23 201 B2 | 11/1978 | Germany . |
| 36 08 752 C1 | 5/1987 | Germany . |
| 41 40 692A1 | 6/1993 | Germany . |
| 44 19 025A1 | 12/1994 | Germany . |
| 44 30 358 A1 | 4/1995 | Germany . |
| 43 39 347 A1 | 5/1995 | Germany . |
| 4413756C1 | 7/1995 | Germany . |
| 195 14 325 A1 | 10/1995 | Germany . |
| 2245775 | 1/1992 | United Kingdom . |
| 97/34786 | 9/1997 | WIPO . |

*Primary Examiner*—Paula Bradley
*Assistant Examiner*—Tho D. Ta
*Attorney, Agent, or Firm*—Venable; Norman N. Kunitz

[57] ABSTRACT

A plug-and-socket connector having a conductor track structure provided with electrical components, and a method of producing the same.

Known plug-and-socket connectors in which a conductor track structure is formed from a metal band can only be embodied with a space-saving design at high cost, and nevertheless have a large structural height. It is very costly to provide such a plug-and-socket connector with components for realizing electrical functions. A design that saves more space, and a smaller structural height, are possible with a plug-and-socket connector having a conductor track structure that is planar and has a window-shaped opening, which is adjoined perpendicularly in one direction by a plug region that receives both the first plug and the second plug inserted from the opposite direction through the window-shaped opening of the conductor track structure. Pin-like tongues are bent, as connecting pins, into the plug region and preferably fixed, with the bent connecting pins and the conductor track structure, by a plastic injection-molded part. Socket contacts for pin-shaped contacting elements at the plugs are disposed in the plug region in insulation chambers and connected to the conductor track structure. Application of such a plug-and-socket connector for an ignition device of airbag systems in motor vehicles.

18 Claims, 8 Drawing Sheets

CONNECTOR WITH A STRIP CONNECTOR FITTED WITH ELECTRICAL COMPONENTS, METHOD FOR THE PRODUCTION THEREOF

BACKGROUND OF THE INVENTION

The invention relates to a plug-and-socket connector whose conductor track structure is provided with electrical components and a method of producing the same.

A plug-and-socket connector of this type is intended to connect two plugs to one another in a small space, thereby receiving an electrical circuit over a conductor track structure having electrical components.

Figure 7:
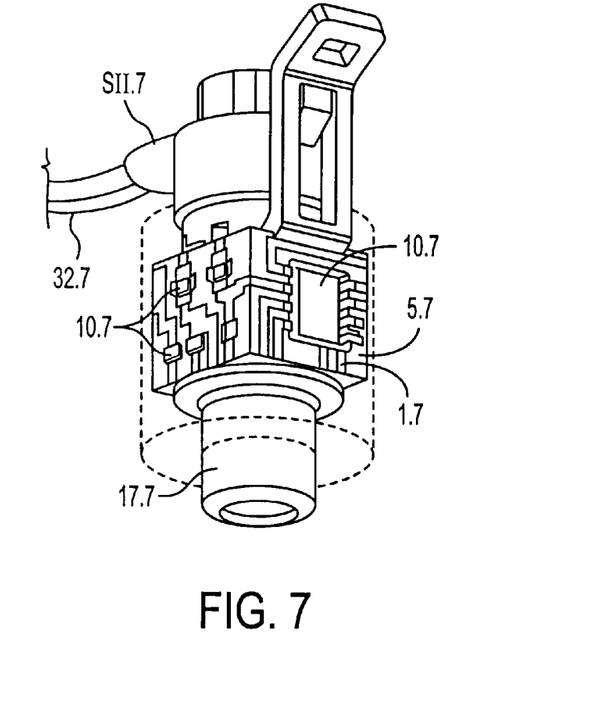
FIG. 7 an ignition device according to the state of the technology.

Shown in FIG. 7 is an ignition device of WO 97/34786 for triggering a retaining means in a motor vehicle, in which a carrier is embodied as a three-dimensional plastic body provided with conductor tracks and connecting pins are bent from the conductor tracks for the single plug, which serves in the electrical connection, and as ignition connecting pins for the priming wire. As is especially apparent from FIGS. 8 through 11 of WO 97/34786, the conductor track structure must be bent multiple times and fixed with plastic bridges in this three-dimensional structure. Mounting electrical components on such a three-dimensional conductor track structure has proven extremely complicated, as is evident from FIG. 1 or 11, for example, of WO 97/34786. In addition, a group of connecting pins is embodied as ignition connecting pins directly with a priming wire and disposed in a carrier of the priming cap. While this permits the omission of an additional plug-and-socket connection, the manufacturing costs are increased because of the subsequent filling with pyrotechnical ignition powder and, ultimately, scarcely any space is saved with respect to a plug-and-socket connector. A space-saving design is crucial for automotive technology, especially airbag-control devices, because the electrical circuitry of these control devices should preferably be disposed directly at the airbag gas generators; however, there is no space or only insufficient space in the immediate vicinity of the airbag, for example in the steering-wheel compartment, in the dashboard or in the parts of the body located next to the seats.

The ignition device according to WO 97/34786, however, has a considerable length, which is dictated by the plug region, the longish conductor track structure and the ignition connecting pins. Mechanical stresses, for example due to vibrations, can therefore act on the mechanical securing elements via a relatively-long lever. Moreover, the manufacturing costs for such an ignition device are very high.

DE 44 13 756 C1 discloses a housing for a plug-and-socket connector for receiving a punched or machine-cut conductor track structure, in which an electrical component, particularly an HF choke, is integrated into the housing, and in which the plug or terminal contacts are formed with a chamfering from the pressed screen. At one half of the housing, protruding pins are provided, with which the sections connecting the conductor tracks are simultaneously separated when the housing is closed, with the individual conductor tracks being fixed by positioning means to one of the housing halves. It cannot be inferred that the conductor tracks are provided with a complete electrical circuit comprising a plurality of electrical components and, because of the loose fastening and the later high mechanical stress of the conductor tracks, for example during the separation, it is not possible. Consequently, further electrical components must be arranged on the outside. Furthermore, the space occupied by the housing is rather large, particularly upon consideration that only one component is integrated.

DE 27 35 124 C2 describes a method of producing printed circuits, in which the conductor track structure is connected by way of connecting webs machined from sheet steel in the form of a steel blank, and the intermediate spaces are filled with plastic, thereby fixing the conductor tracks. Then the connecting webs that remain free from plastic are separated, and the conductor tracks are thus electrically insulated. The electrical components of such a circuit are positioned in recesses in the plastic. For external contacting, bendable tongues are provided at the outer edge region of the conductor track structure, with the connectors of external components being secured in these tongues through chamfering and rolling. Contacting elements, as are necessary for a plug-and-socket connector, are therefore not provided.

A plug-and-socket connector for airbags, in which the contacting elements of the plug-and-socket connector for a connector and plugs leading in from the opposite side are integrated in a plug region, and are particularly embodied in one piece, is further known, for example, from GB 2 245 775 A. The contour of the plug region is formed such that plugs and conductors do not impede one another. This type of plug-and-socket connector is, however, not provided with electrical components for receiving a conductor track structure.

SUMMARY OF THE INVENTION

It is an object of the invention to present a plug-and-socket connector that is simple to produce and is equipped with a plurality of electrical components and, despite this, is very small and compact. It is a further object to provide a corresponding, suitable method of producing the connector.

The plug-and-socket connector has a conductor track structure that is formed as a planar surface, on which a plurality of electrical components can easily be mounted. Pin-like tongues are bent from the conductor track structure into a plug region such that the pins contact the plugs to be connected there.

In the one, common plug region, it is possible to insert the two plugs from opposite directions through a window-shaped opening in the conductor track structure. In a corresponding embodiment of the plugs and the plug region, therefore, a significant amount of space can be saved because the plugs partially project into one another.

The conductor track structure is relatively simple to produce as a lead frame from a metal band, and can be transported easily by machine with a punched-tape guide on both sides. A plastic injection-molded part not only reliably fixes the conductor tracks, but acts as electrical insulation, and is additionally formed as a housing having mechanical functions, particularly in the plug region, in which the plastic injection-molded part is molded as a plug contour.

In addition to the plastic injection-molded part, a plastic assembly part can be used to embody the restraint for the conductor track structure, with the conductor track structure being secured therein, for example pressed or glued.

In principle, the connecting pins formed from the bent, pin-like tongues are, like the socket contacts, applicable for each of the plugs; of course, they are oriented to the respective insertion direction of the plug. The tongues of the connecting pins can have a single bending, or be bent into a U-shape.

The connecting pins contact socket-like contacting elements at the respectively-associated plug-and-socket connectors, while the socket contacts contact pin-shaped contacting elements. The concept of the invention therefore permits a variation in the respectively-selected contacting elements to correspond to the requirements. The socket contacts are preferably held in insulation chambers and electrically connected by way of laterally-bent contact tabs to correspondingly-structured contact zones in the conductor track structure.

A plug-and-socket connection of this type can be reliably secured against inadvertent loosening with numerous structural embodiments of the plug-and-socket connector of the invention. It is taken into consideration here that reverse battery protection is provided here to safeguard against false poling. The conductor track structure and the components are covered by a lid, with the lid also having a window-shaped opening, through which the second plug is inserted into the plug region.

The production method is significantly simpler than the state of the technology mentioned at the outset. First, the basic form of the conductor track structure and all functional components can be produced in a single work cycle; in other words, the pin-like tongues and the window-shaped opening can be created in addition to the conductor tracks, which are still secured by retaining webs. The one-piece embodiment not only simplifies production, but a mechanically highly-stable, electrically well-conducting connection that is particularly insusceptible to disturbances results between the connecting pins and the conductor tracks. Because of the subsequent fixing of the conductor track structure with the bent conductor track structure through plastic injection-molding, the plug region for receiving the plugs, insulating the individual contacting elements from one another and providing the mechanical retention and stopping is formed simultaneously with the fixing for the conductor tracks that are later cut free from the plastic.

Despite this, it is extremely simple to mount electronic components on the conductor track structure embodied as a planar surface. The conductor track structure is coated locally, for example through so-called inlay-Sn plating or spot-plating with other metal coatings, and the components disposed thereupon are connected through re-flow soldering. In the process, the laterally-bent contact tabs of the socket contacts are also soldered to the contact zones of the conductor track structure.

The invention is described in detail below by way of embodiments and figures.

BRIEF DESCRIPTION OF THE DRAWINGS

Further details of the invention characterized in the claims are explained below in conjunction with the attached drawings. Shown are in:

FIGS. 3a and 3b top plan upside view respectively of the conductor track structure having tongues that are bent as connecting pins, and the socket contact according to FIG. 2;

DETAILED DESCRIPTION OF THE PREFERRED EMBODIMENTS

Figure 1:
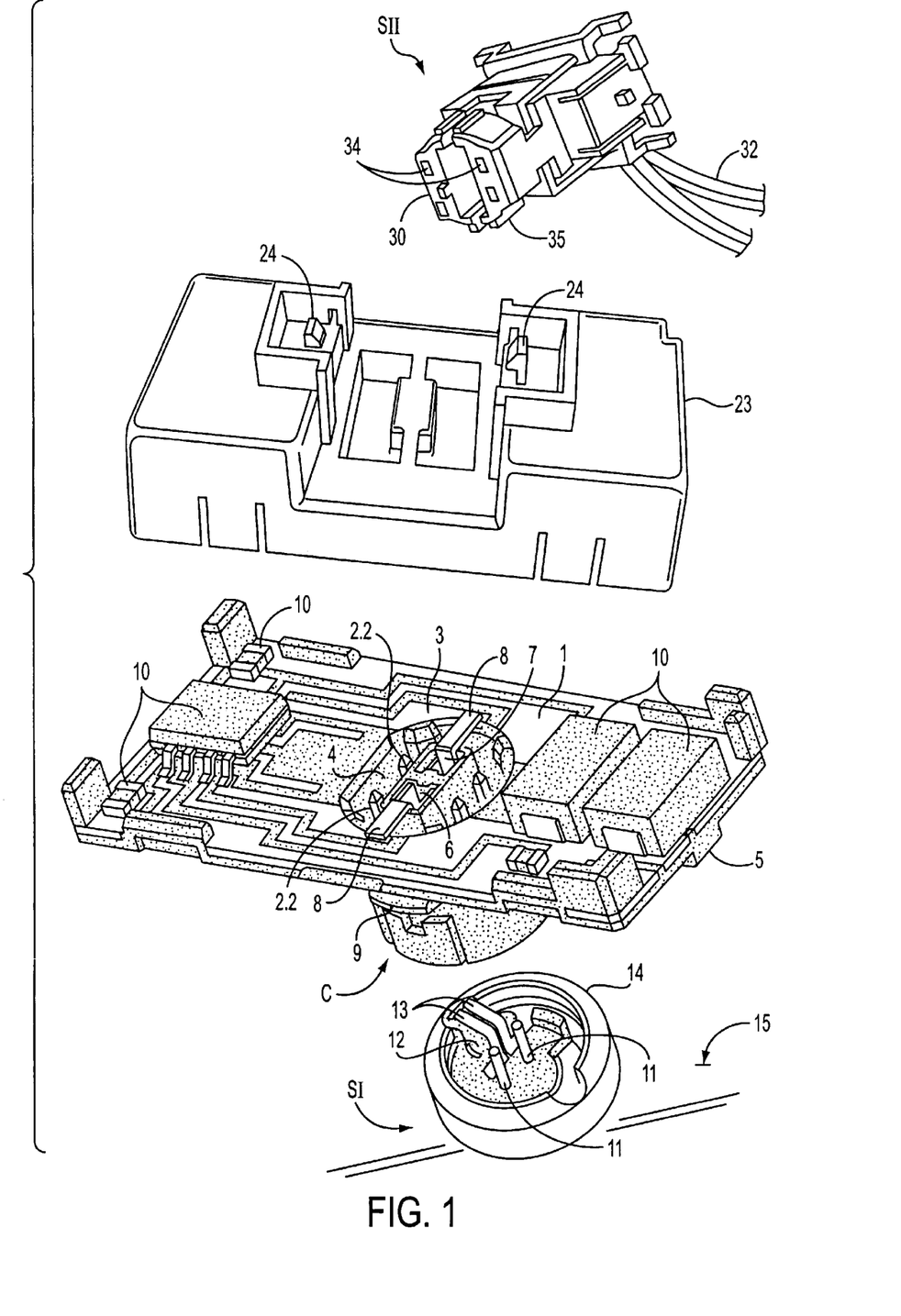
FIG. 1 an overview in an exploded representation.

FIG. 1 shows an overview, partially in explodes fashion, of the plug-and-socket connector C with the two plugs S I and S II to be connected. The plug-and-socket connector C has a conductor track structure 1, which is fixed by a plastic injection-molded piece 5 and has components 10 mounted on its planar surface. Also readily apparent is the window-shaped opening 4 in the conductor track structure 1, which is adjoined by the plug region CA, which can be contacted on both sides; this region is shown cut open, and can be seen better in FIGS. 4 and 6, for example. In FIG. 1, the connecting pins 2.2 are shown inside the plug region CA, the pins being produced through bending, in this case into a U-shape, from pin-like tongues 2.0 of the conductor track structure 1, as becomes more apparent from the subsequent figures. The connecting pins 2.2 are contacted with the socket-shaped contacting elements 34 of the plug S II when the plug penetrates the plug region CA through the window-shaped opening 4.

Moreover, the insulation chambers 6 of the socket contacts 7 can be seen in the plug region CA, the contacts being pressed and/or latched into the chambers. The socket contacts 7 have laterally-bent contact tabs 8, by way of which the socket contacts 7 are connected to contact zones 3 of the conductor track structure 1, for example, soldered with the components 10. The socket contacts 7 are latched or clamped in the insulation chambers 6 and connected, together with electronic components 10, to the conductor track structure 1, for example, by means of inlay-Sn plating through selective roller positioning of a tin depot onto the contact zones 3 of the conductor track structure 1. In this embodiment, the socket contacts 7 are contacted from below with the contacting elements 11 of the first plug S I when this plug is connected to the plug region CA. In this embodiment, according to the preferred application, the plug S I is embodied as an attachment plug of an ignition device of a gas generator 15, for example, for airbags or belt tighteners or the like. In accordance with FIG. 1, the contacting elements 11 in this embodiment are embodied as pins and connected to one another by way of a primer wire inside a pyrotechnical primary priming charge inside the gas generator 15, not shown in detail, so the gas generator 15 can be triggered by the circuit spatially integrated into the plug-and-socket connector C, the circuit comprising the components 10 connected over the conductor track structure 1 due to a corresponding ignition voltage between the contacting elements 11. To avoid a fuse protection of these contacting elements 11 against an inadvertent triggering due to interferences, such as electrostatic charging during assembly, a jumper 13 is provided in a carrier 12 at the plug S I. This jumper 13 can, however, also be provided inside the plug region CA, where it short-circuits, for example, the contacting elements of the plug region for the plug S II, in this embodiment the socket contacts 7, until the plug S II is inserted.

It is apparent from FIG. 1 that the contours 14 and 35 of the plugs S I and S II, respectively, namely the shaping of the inside or outside walls of these plugs, are adapted corresponding to the plug region CA (see FIGS. 9 and 10) and are embodied with stopping elements, which are not described in detail here. The lid 23 protecting the conductor track structure with the components 10 also has stopping elements, which correspond to the plug S II. The lid 23 has clip cams 24, which mesh with clip cams 25 of the plug S II (see also FIG. 4). The plug S II is connected to the cable harness 32. A resetting part 30, which acts on the jumper 13 (see also FIG. 10) through the plug region CA during penetration of the plug S II, is integrated at the contour 35 of the plug S II.

Figure 2A:
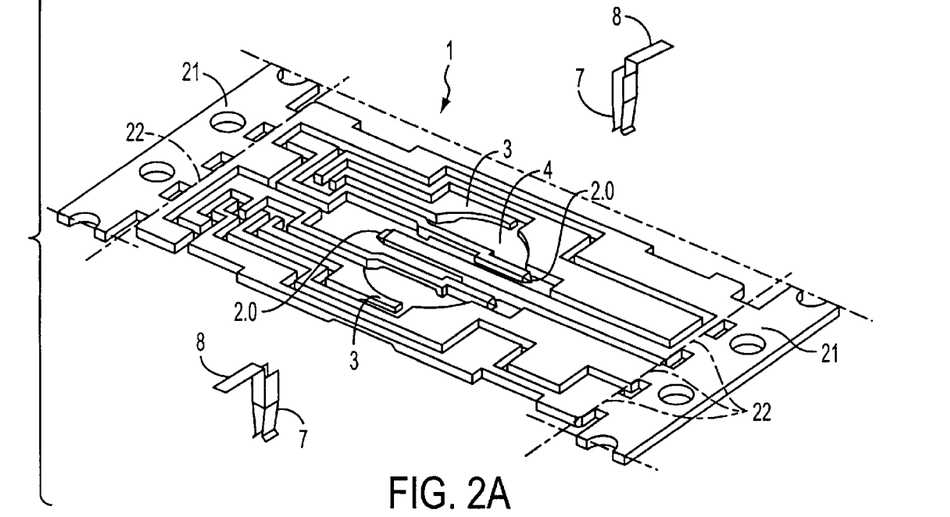
FIGS. 2a and 2b isometric and bottom plan view of the basic form of the conductor track structure with the pin-like tongues and the window-shaped opening of a modified embodiment.
Figure 2B:
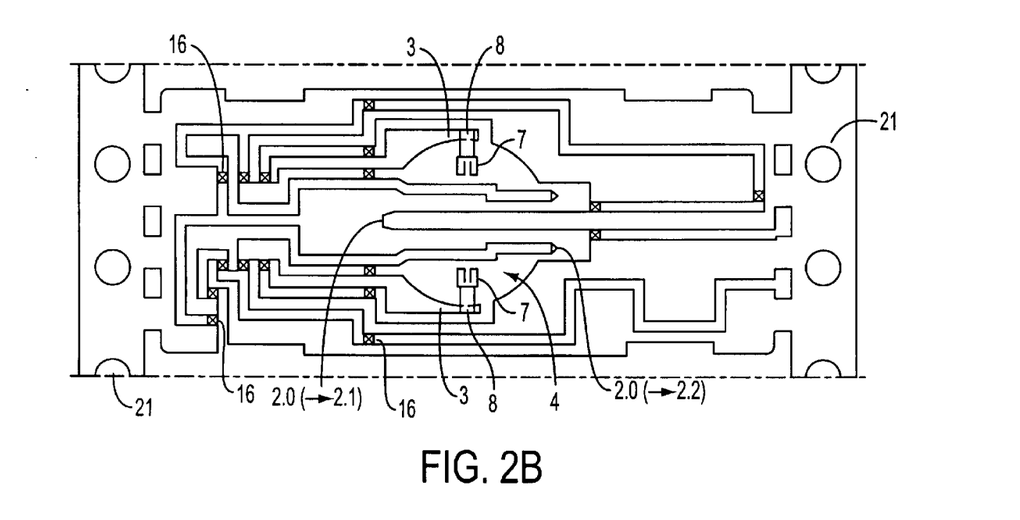

FIG. 2 shows a conductor track structure 1 of an embodiment whose basic form differs from the embodiment in FIG. 1. The conductor track structure 1 of the plug-and-socket connector C is economically mass-produced as an endless band, and is detached from the composite band immediately prior to final assembly through the separation of the perforated edges 21 on both sides. The individual conductor tracks of the conductor track structure 1 are punched together from a metal band, with additional retaining webs 16 connecting and holding the tracks together. Readily apparent here are the pin-like tongues 2.0, which are initially flat when located in the punched window-shaped opening 4, and are used as connecting pins 2.1 or 2.2 by being bent into the plug region CA, as noted by the inclusion of parentheses around the reference characters. The webs 22 toward the perforated edge 21 are also visible in addition to the retaining webs 22. The perforated edge 21 present on both sides serves in handling and transporting the conductor track structure 1 during production. The webs 22, which remain when the perforated edge 21 is separated, serve as test pins for the subsequently-mounted components 10 or the entire circuit formed by the wiring of these components over the conductor track structure 1. For electrical functioning, however, the retaining webs 16 must be removed and the individual conductor tracks must be cut free. This occurs after the plastic injection-molded part 5 has mechanically fixed the conductor tracks. Prior to the plastic injection-molding, the pin-like tongues 2.0 are bent as connecting pins 2.1 and 2.2, respectively, into the plug region CA, as illustrated in detail in two views in FIGS. 3a/b.

Figure 3A:
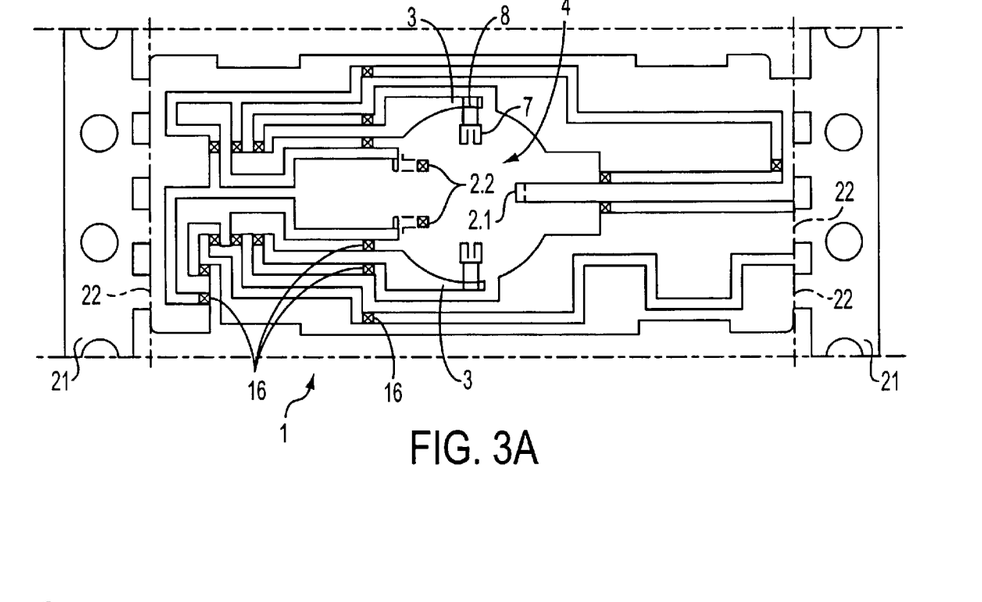
Figure 3B:
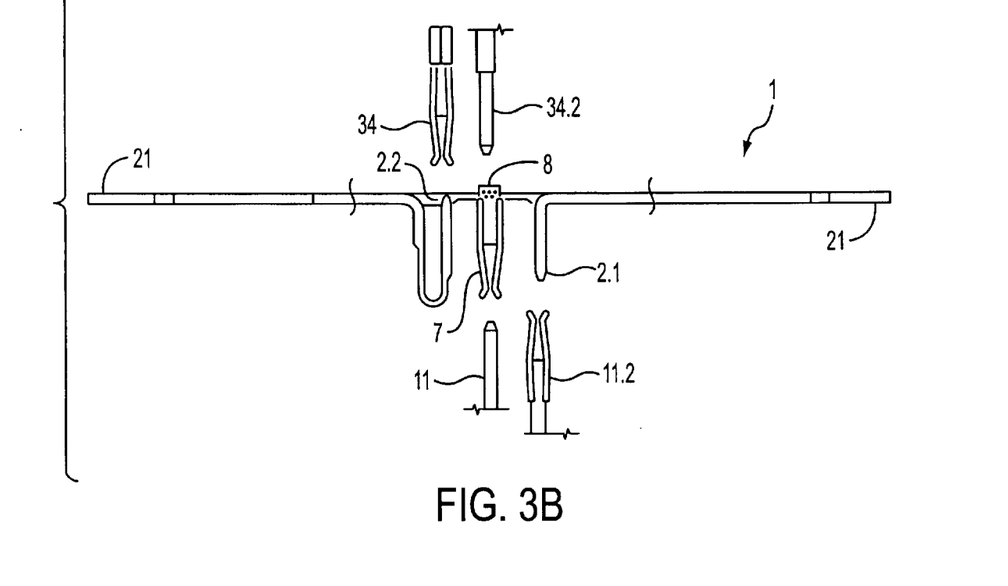

In showing the now-bent tongues, FIG. 3 additionally clarifies the numerous possible variations of the plug-and-socket connectors, for which different embodiments within the window-shaped opening 4 are conceivable. For example, it becomes particularly clear that a socket contact 7 can basically be used for each of the two plugs S I/S II with the use of corresponding, pin-like contacting elements, identified by 11 at the plug S I in FIG. 1 and by 34.2 at the plug S II, and not used in the embodiment according to FIG. 1. Analogously, connecting pins 2.1 for socket-shaped contacting elements 11.2 of the plug S I (not shown in FIG. 1) can be obtained through, for example, single bending of the pin-like tongues 2.0, while connecting pins 2.2 for the socket-shaped contacting elements 34 of the plug S II can be obtained through double or U-shaped bending.

A point to consider in the embodiment of the plug region CA is that the contact tabs 8 and the connecting pins 2.1 and 2.2 do not impede one another, and permit the insertion of the plugs, which have corresponding recesses in their contours 14/35 (see in particular S II in FIG. 1). The window-shaped opening 4 can be partially divided into a region matrix, and the individual fields of this matrix can be associated with the contacting elements and their connecting elements.

The position of the socket contacts 7 is also shown. Two parallel groups of contacting elements for the two plugs S I/S II are located in the common plug region CA. These elements are, however, simultaneously connected by way of the conductor track structure 1, which is perpendicular thereto, to components 10 disposed over the planar surface of the conductor track structure.

Figure 4:
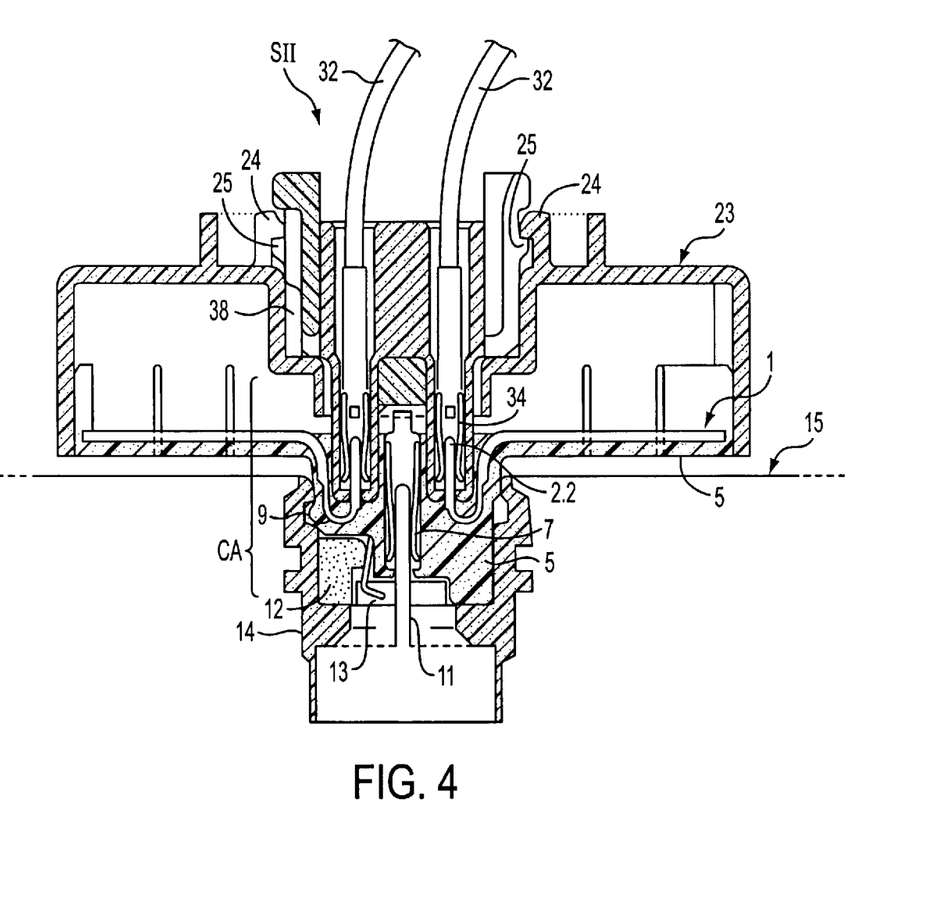
FIG. 4 a plug-and-socket connection in the inserted state, with a section through the plug region.

FIG. 4 shows the plug-and-socket connection in the inserted state. It is readily apparent how the plug S I penetrates the common plug region CA from below, and the plug S II penetrates the region from above, through the window-shaped opening 4 in the conductor track structure 1. Starting from the cable harness 32, a closed electrical connection to the connecting pins 2.2 is produced by way of the contacting elements 34 at the plug S II, and from the pins to the contact zones 3 by way of the conductor track structure 1 with the components 10, with the socket contacts 7 being connected by their contact tabs to the contact zones, and with the socket contacts 7 ultimately being in contact with the contacting elements 11 of the plug S I. The embodiment of the contacting elements can be varied, as is apparent from FIG. 3. The corresponding sectional representation of FIG. 4 clearly shows how the connecting pin 2.2 is fixed in the plastic injection-molded part 5 and the socket contact 7 is fixed in the insulation chamber 6. The jumper 13 is reset by the penetration of the plug S II, and the contacting elements 11 of the plug S I are therefore no longer short-circuited, because now their fuse protection is assured by the circuit embodied on the conductor track structure 1 with the components 10.

Figure 5A:
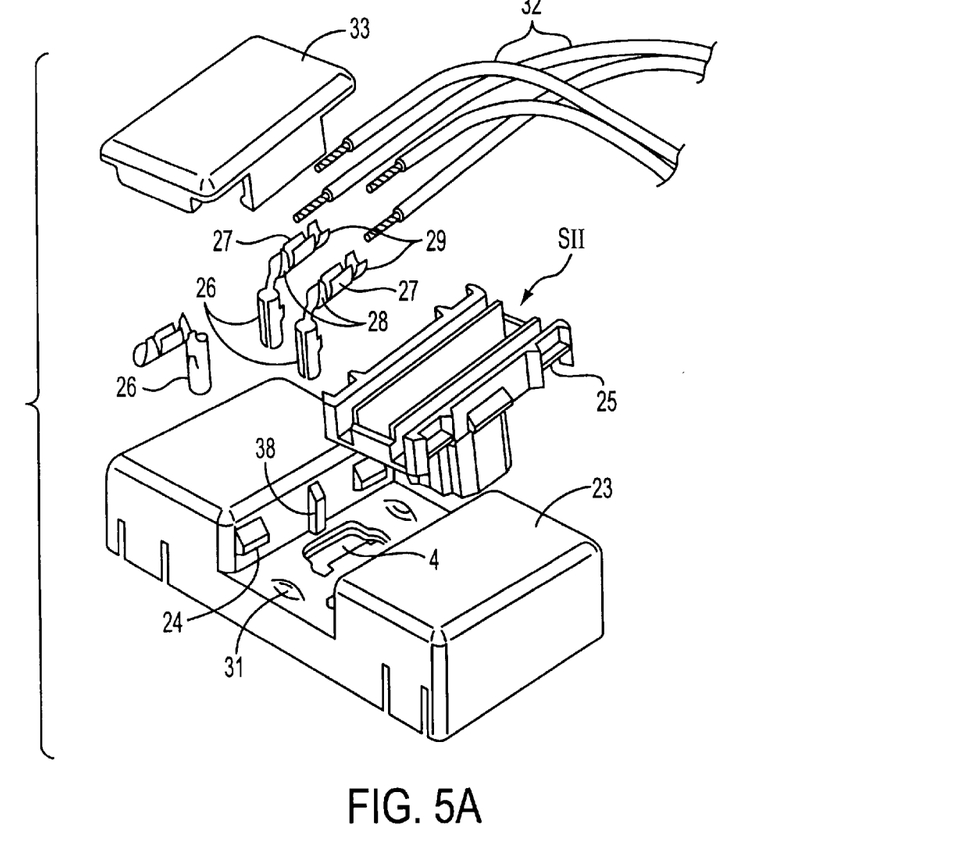
FIGS. 5a and 5b an embodiment of the second plug and a plastic injection-molding of the plug-and-socket connector, respectively.

FIG. 5a shows a further embodiment of the lid 23 and the plug S II. Here a bias between the parts is attained by spring tongues 31 mounted on the lid 23 and acting on the plug S II. Finally, the outer surfaces of the lid 23 are provided with cams 38, which effect an encoding or polarization of the plug-and-socket connection with corresponding contours of the plug S II.

The lines 32 are held in the plug S II by means of insulation-displacement contacts 26 having strain-relief clips 28, 29 on both sides of the insulation-displacement zone 27, which attains a double tension relief in the plug. The arrangement is closed by a cover 33.

Figure 5B:
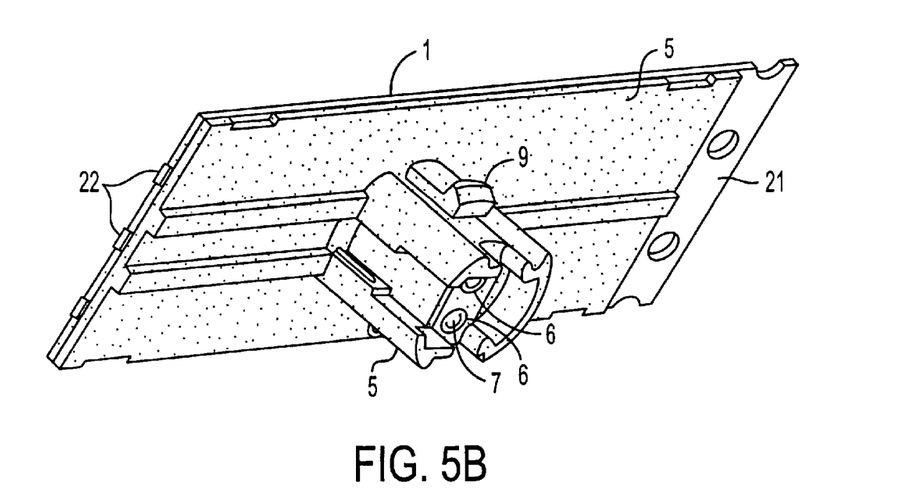

FIG. 5b shows how the conductor track structure 1 is fixed by plastic that is added as an assembly part, or is preferably embodied as a plastic injection-molded part 5. The plastic injection-molded part 5 covers one side of the conductor track structure 1, on the one hand, and, on the other hand, forms the plug region CA, whose inner and outer contours coincide with those of the plugs S I and S II. Stopping elements (e.g. the outer, resilient latching hooks 9 and inner latching openings) are embodied in the contour of the plug region CA, and effect a mechanical retention between the plugs and the plug-and-socket connector. Embodied in the outer wall of the plug region are resilient latching hooks 9, with which the contour of the plug S II or the gas-generator housing can be latched, and whose position in the insertion path of the plug S II causes them to be blocked during insertion of the plug S II into its contour so as to reliably preclude an inward spring deflection of the latching hooks 9, and thus a detachment of the latching connection. Furthermore, the insulation chambers 6 into which the socket contacts 7 are inserted can also be formed by means of the plastic injection-molding.

The contour of the plug region CA, the stopping elements and the insulation chambers 6 are integral parts of the plastic injection-molded part 5, and are mounted on the conductor track structure 1 in one work cycle, assuring a low-cost production of the plug-and-socket connector C.

Figure 6A:
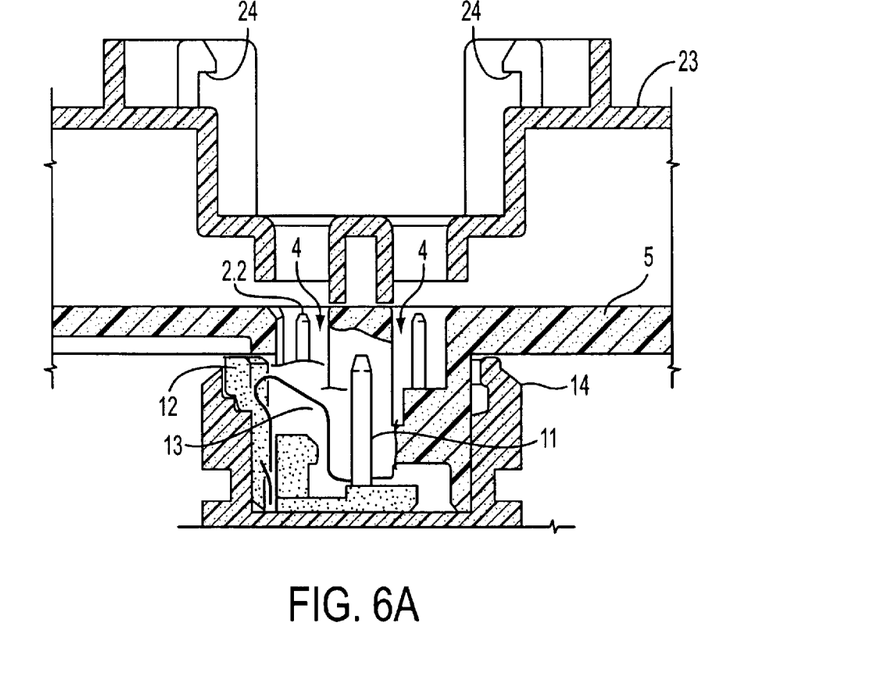
FIGS. 6a and 6b the plug-and-socket connection, respectively before and after the penetration of the second plug through the window-shaped opening into the plug region, and resetting of the jumpers.
Figure 6B:
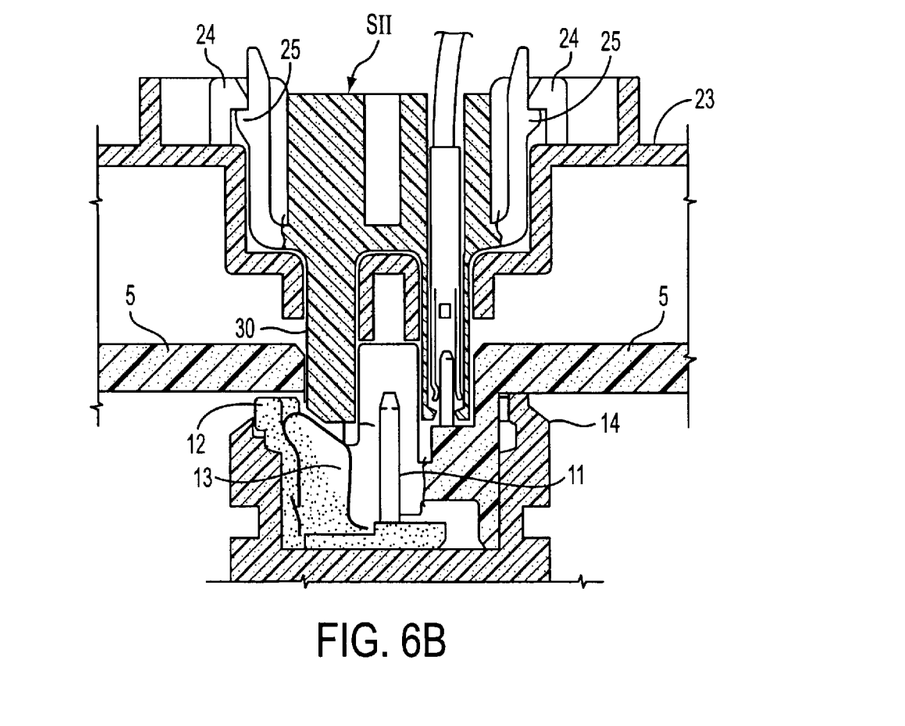

This structural cooperation between the plug-and-socket connector C and the plugs S I/S II is shown in detail in FIGS. 6a and 6b. In a comparison of FIGS. 6a and 6b, it is particularly apparent how the jumper 13 is reset by the contacting elements 11 during the penetration of the plug S II in that, through a recess in the plastic injection-molded part 5, which is visible on the rear side of the injection-molded part in FIG. 5b, the resetting part 30 acts on the jumper 13 projecting between the connecting pins 2.2 into the plug region CA.

Moreover, the latching hook 9 is prevented from moving backward by the penetration of the plug S II, so the plug-and-socket connector C cannot detach from the plug S I as long as the plug S II is inserted (see also FIG. 4).

Figure 8:
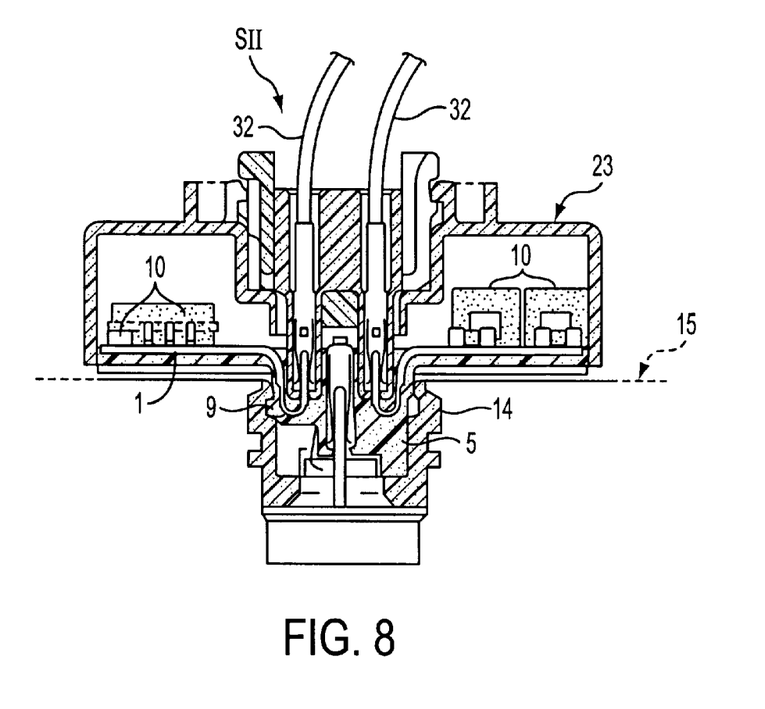
FIG. 8 a plug-and-socket connector for comparison to FIG. 7.

FIG. 7 allows a comparison between the plug-and-socket connector of the invention, which is shown for comparison in FIG. 8, and the arrangement known from the state of the technology. The components 10.7 are mounted on a three-dimensionally-bent, parallelepiped conductor track structure and partially sunk into it. From this conductor track structure, the connecting pins are bent upward toward the plug S II.7 with its conductor 32.7, and downward into the primary primer chamber 17.7. The structural height is consequently increased. The plastic injection-molded part 5.7 is more complicated, and it is more costly to mount components on the conductor track structure 1.7.

The plug-and-socket connector C according to the invention and shown in FIG. 8 lies with a large surface against the outer wall of the gas generator 15, and is clearly less sensitive to mechanical stresses. The common plug region CA for the two plugs reduces the structural height. The conductor track structure 1 disposed perpendicular to the plug region CA, as a plane, is easier to equip.

Figure 9:
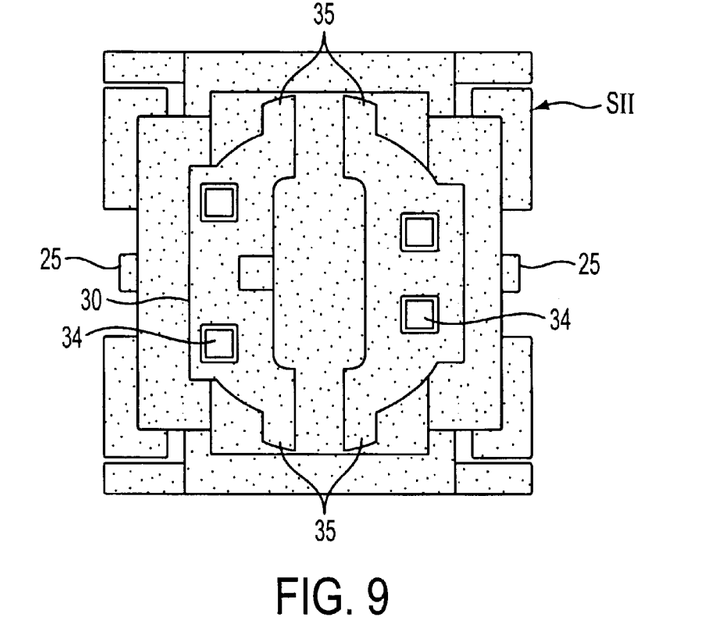
FIG. 9 a view of the contour of the plug S II.
Figure 10:
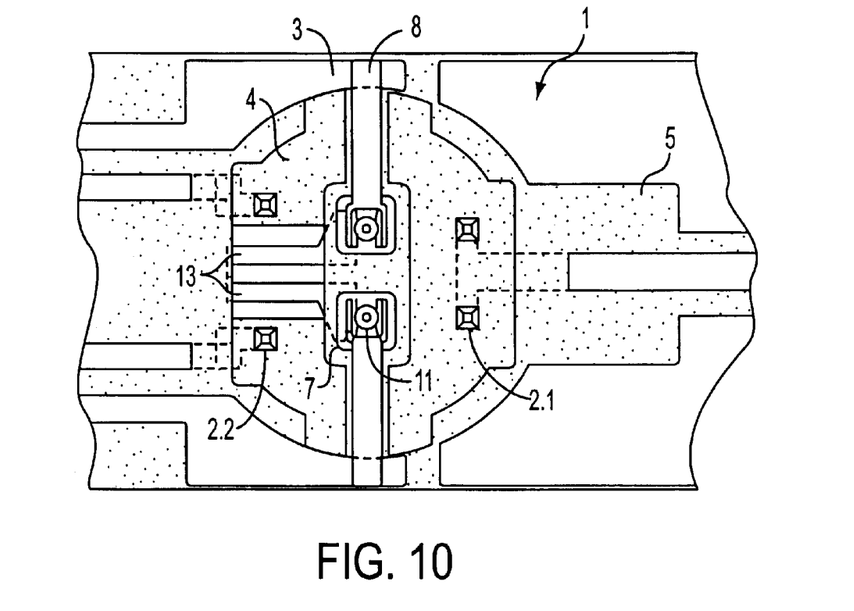
FIG. 10 a view of the plug region Ca when the plug S I is inserted.

FIGS. 9 and 10, which show the contours of the plugs S II and the plug region CA, clarify the reverse battery protection of these plugs: the contours are embodied such that the plugs S I/S II can only be inserted one way into the plug region CA.

In addition, the connectors and the plug-and-socket connector are also encoded with respect to one another by their contours, so exactly one plug-and-socket connector having the respectively-associated circuit arrangement for a certain plug, for example a specific airbag type, fits on the conductor track structure.

At the plug S II, the contacting elements 34 are in a trapezoidal arrangement, with two different spacings, between two respective contacting elements 34. It is also possible to attain a reverse battery protection through the provision of the protruding contour 35 (see also S II in FIG. 1) with side edges of unequal lengths, and a corresponding embodiment of the contour of the plug region CA. In addition, the recesses in the contour 35 of the plug S II for the socket contacts 7, with their contact tabs 8 and their insulation chambers 6, oppose a twisted insertion of the plug S II (see also the three-dimensional view in FIG. 1).

The plug S I has reverse battery protection from the one-sided embodiment of the carrier 12 of the jumper 13. FIG. 10 shows particularly well how the jumper 13 penetrates the plug region CA through a recess in the plastic injection-molded part 5 of the plug region, and is reset there by the resetting part 30 integrated at the contour 35 of the plug S II upon insertion of the plug S II by the contacting elements 11.

What is claimed is:

1. A plug-and-socket connector having a conductor track structure (1) that is provided with electrical components (10), particularly for an ignition device of airbag systems in motor vehicles, in which a1) a first plug (S I) is connected to the conductor track structure (1) by a first group of contacting elements of the conductor track structure (7/2.1), a2) the conductor track structure (1) is formed from a metal band, a3) the conductor track structure (1) is in turn connected to a second plug (S II) by a second group of contacting elements of the conductor track structure (2.2/7), b) the conductor track structure (1) is embodied as a planar surface extending perpendicular to the first and second groups of contacting elements (2.1, 2.2, 7), c) a window-shaped opening (4) is embodied in the conductor track structure (1), and is adjoined perpendicularly by a plug region (CA) in one direction, d) the plug region (CA) receives both the first plug (S I) and the second plug (S II) inserted from opposite directions through the window-shaped opening (4) of the conductor track structure (1), e) the first and second groups of contacting elements of the plug-and-socket connector (C) each comprise at least one contacting element, each element being embodied as e1) a connecting pin (2.1, 2.2) in the form of a pin-like tongue (2.0) of the conductor track structure (1), with the tongue being bent into the plug region (CA), and with the pin being connected there to an associated, socket-shaped contacting element (34, 11.2) of the respectively associated plug, or e2) as a socket contact (7) that is electrically connected in the plug region (CA) to an associated, pin-shaped contacting element (34.2, 11) of the respectively associated plug, on the one hand and, on the other hand, to the conductor track structure (1).

2. The plug-and-socket connector according to claim 1, wherein a jumper (13) is provided for short-circuiting contacting elements (11) of the first plug (S I), the jumper being reset by the insertion of the second plug (S II).

3. The plug-and-socket connector according to claim 1, wherein the plug region (CA) has insulation chambers (6) for the socket contacts (7), in which the contacts are retained by means of latching or clamping.

4. The plug-and-socket connector according to claim 3, wherein each socket contact (7) has a laterally-bent contact tab (8), and contact zones (3) are provided at an edge of the window-shaped opening (4) in the conductor track structure (1), the zones electrically connecting the socket contacts (7), with their contact tabs (8), to the conductor track structure (1).

5. The plug-and-socket connector according to claim 1, wherein the conductor track structure (1), including the first and second groups of contacting elements in the plug region (CA), are fixed by a plastic injection-molded part (5) and the plastic injection-molded part (5) has a contour that permits a mechanical retention of the first and second plugs (S I/S II).

6. The plug-and-socket connector according to claim 5, wherein reverse battery protection means are provided for safeguarding against false poling, so the first and second plugs can only be inserted in a position that corresponds to the predetermined electrical poling.

7. The plug-and-socket connector according to claim 5, wherein the plug region (CA) has in its contour stopping elements for the first and second plugs, particularly latching hooks and/or latching openings, which stop the first and second plugs following insertion into the plug region (CA).

8. The plug-and-socket connector according to claim 1, wherein a lid (23) is provided, which covers the conductor track structure (1) with the electrical components (10), the lid likewise having a window-shaped opening, through which the second plug (S II) is inserted into the plug region (CA).

9. The plug-and-socket connector according to claim 8, wherein stopping elements (24) for the second plug (S II) are provided on the lid (23).

10. The plug and socket connector according to claim 7 wherein:
   reverse battery protection means are provided for safeguarding against false poling, so the first and second plugs can only be inserted in a position that corresponds to the predetermined electrical poling,
   a lid (23) is provided, which covers the conductor track structure (1) with the electrical components (10), with the lid likewise having a window-shaped opening, through which the second plug (S II) is inserted into the plug region (CA); and
   stopping elements (24) for the second plug (S II) are provided on the lid (23).

11. The plug-and-socket connector according to claim 10, wherein the stopping elements of the plug region (CA) and/or stopping elements (24) of the lid (23) are disposed as reverse battery protection means with respect to the first and second plugs (S I/S II).

12. A plug-and-socket connector according to claim 1 for an ignition device of an airbag system in motor vehicles, wherein
   a) the first plug (S I) is molded on a housing of an airbag (15),
   b) an electrical circuit realized by the conductor track structure (1) with the electrical components (10) is an ignition control element of the airbag system, and
   c) the second plug (S II) is connected by integrated connecting elements to a cable harness (32) to four a central unit of the airbag system.

13. The arrangement according to claim 12, wherein the second plug (S II) is connected to the cable harness (32) by insulation-displacement connectors (26).

14. The plug-and-socket connector according to claim 1, wherein spring tongues (31) are disposed on the lid (23) for attaining a bias between the plug region (CA) and the second plug (S II).

15. A method of producing a plug-and-socket connector (C) having a conductor track structure (1) that is provided with electrical components (10), according to one of claims 3 through 2, characterized by the following features:
   a) punching of a basic form of the conductor track structure (1) with the pin-like tongues (2.0) and the window-shaped opening (4) in one piece from the metal band, with additional retaining webs (16) being provided for retaining the individual conductor tracks,
   b) bending of the pin-like tongues (2.0) into the plug region (CA),
   c) fixing of the conductor track structure (1) by a plastic injection-molded part (5),
   d) separating the retaining webs (16) for electrically insulating the individual conductor tracks, and
   e) mounting of the electrical components (10) on the conductor track structure (1).

16. The method according to claim 15, wherein, for fixing the conductor track structure (1), the plastic injection-molded part (5) at least extensively covers one side of the conductor track structure (1) and, at the same time, the plug region (CA) is molded with this part.

17. The method according to claim 15, wherein the conductor track structure (1) is punched with a perforated edge (21), and webs (22), which connect the conductor track structure (1) to the perforated edge (21), serve as test pins for the components (10) disposed on the conductor track structure (1) following the separation of the perforated edge (21).

18. The method according to claim 15, wherein the conductor track structure (1) is tin-plated through rolling of a selective tin-depot coating (inlay-Sn plating), and the electronic components (10) are soldered with the contact tabs (8) of the socket contacts (6).

* * * * *